UNITED STATES PATENT OFFICE.

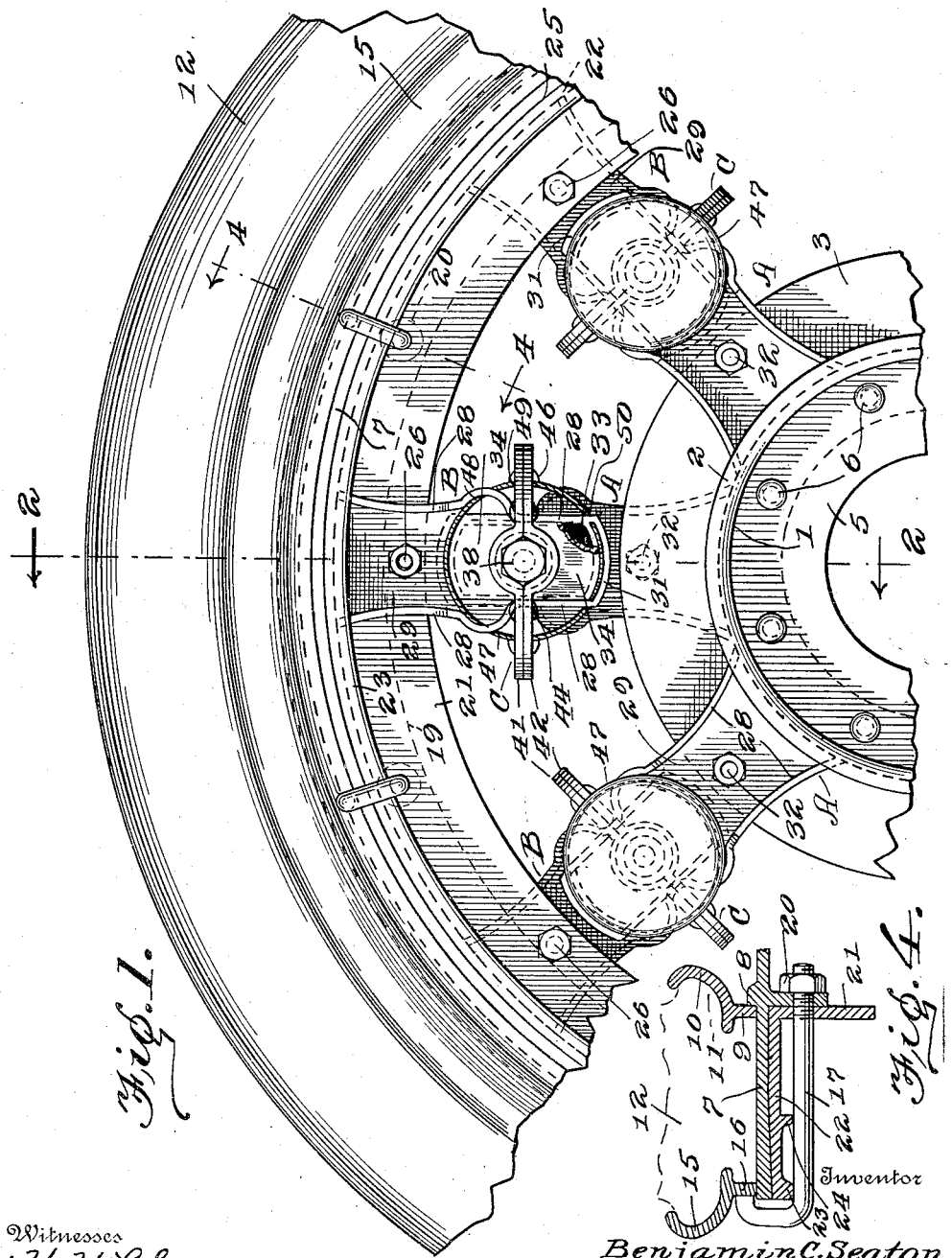

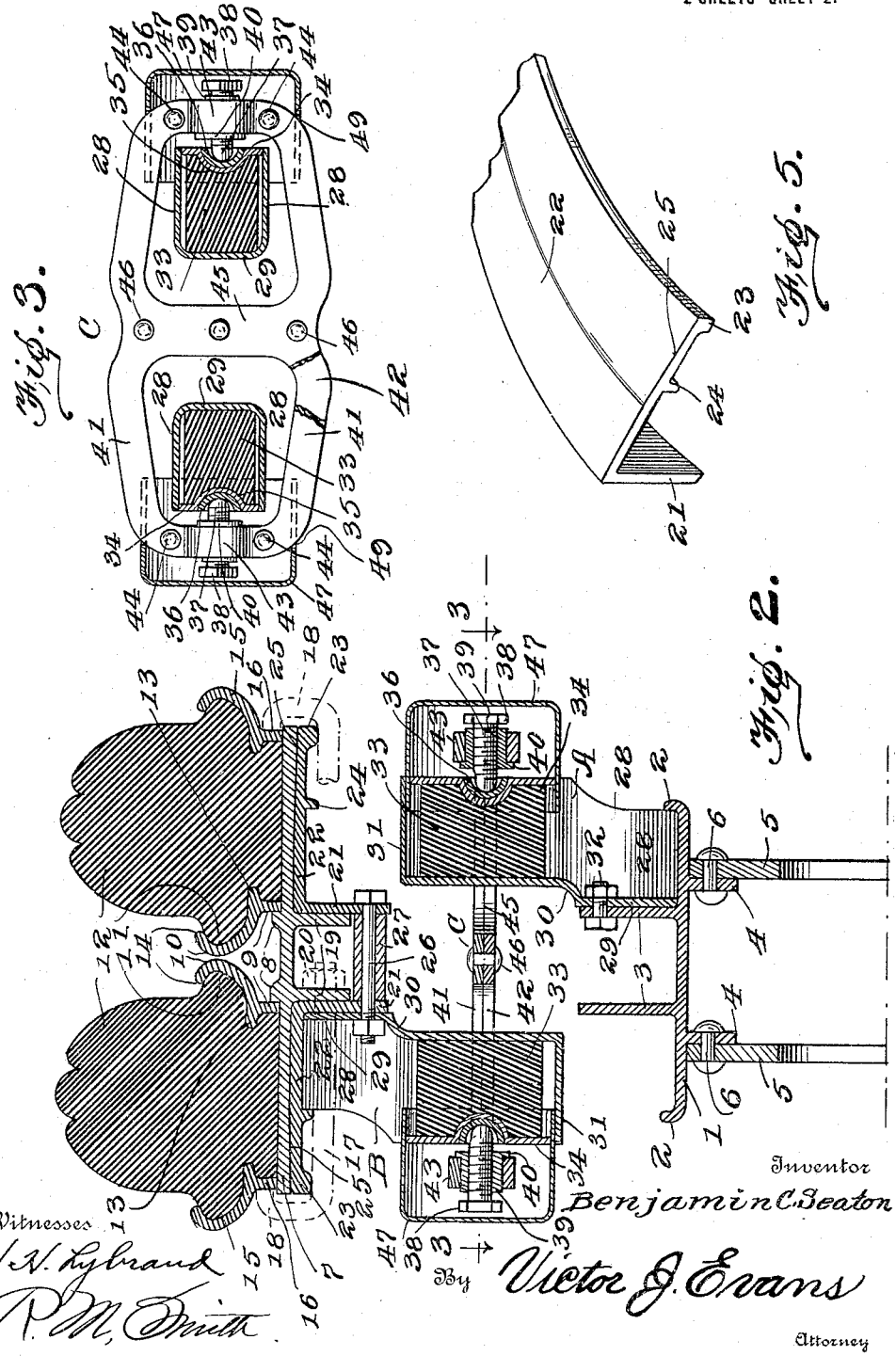

BENJAMIN C. SEATON, OF NASHVILLE, TENNESSEE.

RESILIENT WHEEL.

1,211,885.   Specification of Letters Patent.   Patented Jan. 9, 1917.

Application filed April 15, 1916.   Serial No. 91,366.

*To all whom it may concern:*

Be it known that I, BENJAMIN C. SEATON, a citizen of the United States, residing at Nashville, in the county of Davidson and State of Tennessee, have invented new and useful Improvements in Resilient Wheels, of which the following is a specification.

This invention relates to resilient wheels, the object in view being to produce a wheel in which the road shocks are absorbed by the wheel, enabling a solid rubber tire or tire of any other description to be employed thereby preventing all of the usual troubles incident to the use of pneumatic tires.

The particular object of the present invention is to produce a wheel structure which will enable the several parts or elements thereof to be easily assembled thereby reducing the cost of manufacture of the wheel and the cost of maintenance thereof, also affording ready access to the different portions of the wheel for repair or replacement purposes.

Another object of the invention is to produce a wheel of the class referred to especially adapted for the use of quick detachable tires.

A further object is to provide a structure in which the arms of the outer and inner rims may be quickly applied and removed and securely held in fixed relation to the respective portions of the wheel each by a single fastener such as a bolt.

A further object of the invention is to provide novel and effective means for securing the tire and the tire holding rings to the tire-carrying rim to enable the tire to be taken off and put on easily and quickly and also to provide means whereby the tire is prevented from creeping longitudinally of the rim, said means also serving to support the tire laterally without danger of rim cutting.

A further object in view is to eliminate the use of wood in the construction of the wheel thereby at the same time eliminating liability of shrinkage and swelling under different atmospheric conditions, the structure as a whole being especially adapted to heavy duty such as the use thereof in connection with motor trucks; at the same time the structure on a lighter scale is also adapted for pleasure vehicles.

With the above and other objects in view, the invention consists in the novel construction, combination and arrangement of parts, as herein described, illustrated and claimed.

In the accompanying drawings, Figure 1 is a fragmentary side elevation of a wheel embodying the present invention, one of the dust caps being shown in section. Fig. 2 is a fragmentary cross section through the same on the line 2—2 of Fig. 1. Fig. 3 is a section on the line 3—3 of Fig. 2. Fig. 4 is a fragmentary section on the line 4—4 of Fig. 1. Fig. 5 is a fragmentary perspective view of one of the arm carrying rings.

The wheel contemplated in this invention is in the nature of an improvement upon prior patents granted to me and in the preferred embodiment of this invention, the wheel comprises an inner fixed rim 1 having at the opposite sides thereof marginal flanges 2, said rim being also provided between the ends and on the outer face thereof with longitudinal flanges 3 arranged in spaced and parallel relation to each other as shown in Fig. 2. The rim 1 is provided on its inner face with flanges 4 in parallel and spaced relation to each other to which the annular hub plates 5 are connected by fasteners 6. All of the parts thus far described have a fixed relation to each other.

The outer tire carrying rim 7 is movable in relation to the inner fixed rim 1 being supported in relation thereto by resilient means to be hereinafter particularly described. Said outer rim is formed on its outer face with annular ribs 8 against which abut the inner flanges 9 of a pair of clencher rings 10 which as shown in Fig. 2 embrace the inner beaded portions 11 of a pair of tires 12 preferably of rubber although said tires may be of any desired construction and composed of any suitable material. Each of the rings 10 has an inwardly extending annular lip 13 adapted to embed itself in the tire in close proximity to the rim 7 and it is also provided with the clencher portion 14 adapted to partially embrace the beaded portion 11.

Similar tire retaining rings 15 are located at the outer sides of the tires 12 and are formed with flanges 16 which surround and bear against the outer face of the rim 7 and are adapted to be held in place by fastening means shown in the form of bolts 17 having hook-shaped extremities 18 which bear directly against the flanges 16.

On its inner face the outer rim 7 is provided with stop flanges 19 arranged in parallel and spaced relation to each other, the bolts 17 passing through said flanges and the plate 21 as shown in Fig. 4, the inner ends of said bolts being threaded to receive nuts 20 which bear against the inner faces of the flanges 19.

In connection with the rim 7 I employ a pair of annular arm carrying rings of the formation illustrated in Figs. 2 and 5, each of said rings comprising an annular flange 21 which bears against the outer face of the respective flange 19, and an overhanging laterally extending flange 22 which is disposed inside of or under one of the tires 12. The outer edge of the flange 22 is reinforced by forming the same with a bead 25 on the inner face thereof and each ring is also formed on its inner face with an annular abutment rib 24 the purpose of which will presently appear. The outer portion of each of the arm carrying rings is formed with a laterally inclined or tapered face 25 and the rim 7 is shrunk upon both of the arm carrying rings so that in effect said rings form a fixed part of the outer rim 7 thus preventing any lateral relative movement or displacement between said arm carrying rings and the outer rim. Bolts 26 are inserted through transversely alined holes in the flanges 21 and spacing sleeves 27 are placed around said bolts, each of said bolts serving to fasten in place one of the arms hereinafter described.

The inner rim 1 carries an annular series of arms each of which is designated at A and the outer rim 7 carries another annular series of arms designated generally at B. The arms A and B are the counterpart of each other and these arms are arranged in pairs as indicated in Figs. 1 and 2, one arm of each pair being secured to the inner rim and the other arm of each pair being secured to the outer rim. Each arm is of hollow or channeled formation, comprising the substantially parallel sides 28, the rear wall or body 29 which is offset at 30 and an outer end wall 31. The body 29 of each of the arms A is fastened securely to one of the flanges 3 of the inner rim by means of a bolt 32 or the equivalent thereof and as the inner portion of said arm bears directly against the inner rim 1 and is confined between the flanges 2 and 3, said single fastening device holds the arm in fixed relation to the inner rim. The body portion or inner wall 29 of each arm B receives one of the bolts 26 above referred to and the inner end of said arm being of channeled formation and confined between the flange 21 and the rib 24, said arm is secured in fixed relation to the outer rim by means of a single bolt.

In the outer channeled end portion of each of the arms A and B there is placed a cushion 33 preferably of rubber. Against the outer face of the cushion 33 bears a follower 34 which is formed centrally thereof with a cup-shaped offset 35 containing a bearing cup 36 of hardened steel. The cup 36 receives the inner rounded extremity of a bearing screw 37 the outer end of which is provided with a head 38. The screws 37 are threaded through bushings 39 having heads or flanges 40 at their inner ends. The bushings are carried by a yoke designated generally at C and illustrated in plan view in Fig. 3. As shown in Figs. 2 and 3 combined, each yoke comprises twin sections or is centrally and longitudinally split or divided as shown in Fig. 2, the end portions of the sections 41 and 42 of the yoke being provided at their opposite extremities with oppositely curved or substantially semi-circular portions 43 which embrace the bushings 39. Fasteners 44 such as bolts or rivets connect the sections 41 and 42 at opposite sides of each of the semi-circular parts 33 and the yoke sections are further formed with central transverse portions 45 which are also fastened together as indicated at 46.

In order to exclude dirt, dust, grit and the like from the bearing screws 37 and the bearing cups 36, protecting caps 47 are employed as shown in Figs. 1, 2 and 3, each of said caps being formed with slots 48, 49 and 50 to enable them to be slid inwardly so as reach beyond the follower 34 and house in the hardened steel bearing screws 37 and cups 36. The caps 47 may be fastened in place by any usual or preferred means.

By reference to Fig. 1 it will be observed that the arms fastened to the outer rim are staggered in relation to each other or, in other words, one arm is arranged at one side of the center of the outer rim while the adjacent arms are located at the opposite side of the outer rim. The same relative arrangement applies to the arms which are fastened to the inner rim 1. Therefore, as one end of the rocking yoke shown in Fig. 1 moves inwardly toward the center of the wheel, the opposite ends of the yokes at each side thereof move inwardly toward the center of the wheel. In other words, referring to Fig. 2, if the left hand end of the yoke in said figure is depressed or moved toward the center of the wheel, the opposite ends of the yokes next adjacent to the one shown in Fig. 2 will be depressed at the right hand end, the yokes therefore alternately tilting in opposite directions. As a yoke tilts under the inward movement of one of the arms B, that end of the yoke is moved inwardly while the opposite end of the yoke remains relatively in the same place. This gives an angularity or tilting position to the yoke but as the distance between the rounded inner extremities of the bearing screws 37 cannot vary, the cushions 33 are compressed. This not only absorbs all road jars and vibrations but the cushions act to restore the yokes to their normally horizontal positions as rapidly as they are diverted therefrom. Furthermore, all of the cushions 33 throughout the entire annular space between the inner and outer rims contribute to absorb shocks and vibrations, the same being equally distributed upon all of said cushions. Furthermore, it will be observed that each of the cushions or rubber blocks 33 is imperforate or solid, there being no bolt or other device passing therethrough which would weaken the same and decrease the resiliency and cushioning effect thereof. Additionally, it will be noted that I dispense entirely with the use of any ball and socket joint between the element which connects the arms on the outer and inner rims. This enables me to eliminate the use of oil or other lubricating material which would be quickly injurious to the rubber cushions. In lieu of such ball and socket joint, I employ the follower 34, the bearing cup 36 located on the outside thereof and held in place thereby, and the bearing screw 37. It will of course be seen that each of the screws 37 is adjustable through the bushing or nut 39 and therefore constitutes also in effect a set screw enabling the necessary adjustment to be made to compensate for any shrinkage of the rubber cushion or to compensate for any variation in the sizes of said cushions. Said screws also serve to tension the wheel adapting the same to heavier or lighter loads.

I claim:—

1. In a resilient wheel, an inner fixed rim, an outer rim, arms having a fixed relation to the inner rim projecting outwardly therefrom and staggered in relation to each other, other arms bearing the same relation to the outer rim but projecting inwardly therefrom, the arms of both series being arranged in pairs and the arms of each pair being arranged in opposed and spaced relation to each other, cushions carried by said arms, an oscillatory yoke embracing the arms of each pair and entirely embracing said cushions, imperforate followers bearing against the outer sides of said cushions, and bearing members carried by the end portions of said yoke and coöperating with said followers to compress the cushions of each pair of arms as the yoke is oscillated.

2. In a resilient wheel, an inner fixed rim, an outer rim, arms having a fixed relation to the inner rim projecting outwardly therefrom and staggered in relation to each other, other arms bearing the same relation to the outer rim but projecting inwardly therefrom, the arms of both series being arranged in pairs and the arms of each pair being arranged in opposed and spaced relation to each other, cushions carried by said arms, an oscillatory yoke embracing the arms of each pair and entirely embracing said cushions, imperforate followers bearing against the outer sides of said cushions, imperforate bearing cups carried by said followers, and bearing members carried by the end portions of said yoke and coöperating with said cups and followers to compress the cushion of each pair of arms as the yoke is oscillated.

3. In a resilient wheel, an inner fixed rim, an outer rim, arms having a fixed relation to the inner rim projecting outwardly therefrom and staggered in relation to each other, other arms bearing the same relation to the outer rim but projecting inwardly therefrom, the arms of both series being arranged in pairs and the arms of each pair being arranged in opposed and spaced relation to each other, an oscillatory yoke embracing the arms of each pair, cushions carried by said arms, followers bearing against the outer sides of said cushions, and bearing members carried by the end portions of said yoke and coöperating with said followers to compress the cushions of each pair of arms as the yoke is oscillated, all of said arms being of channeled formation and forming housings which completely inclose the cushions.

4. In a resilient wheel, an inner fixed rim, an outer rim, arms having a fixed relation to the inner rim projecting outwardly therefrom and staggered in relation to each other, other arms bearing the same relation to the outer rim but projecting inwardly therefrom, annular arm carrying-rings united to the inner face of the outer rim and having the last named arms fastened thereto, the arms of both series being arranged in pairs and the arms of each pair being arranged in opposed and spaced relation to each other, an oscillatory yoke embracing the arms of each pair, cushions carried by said arms, followers bearing against the outer sides of said cushions, and bearing members carried by the end portions of said yoke and coöperating with said followers to compress the cushions of each pair of arms as the yoke is oscillated.

In testimony whereof I affix my signature.

BENJAMIN C. SEATON.

Copies of this patent may be obtained for five cents each, by addressing the "Commissioner of Patents, Washington, D. C."